Jan. 29, 1957 W. R. JACKSON 2,779,202
MULTIPLE UNIT V-BELT SHEAVE
Filed June 8, 1954

INVENTOR.
WILLIAM R. JACKSON
BY Oldham & Oldham
ATTORNEYS

United States Patent Office 2,779,202
Patented Jan. 29, 1957

2,779,202

MULTIPLE UNIT V-BELT SHEAVE

William R. Jackson, Akron, Ohio

Application June 8, 1954, Serial No. 435,277

7 Claims. (Cl. 74—230.3)

This invention relates to a multiple sheave for V-belts and the like wherein one or more V-belts can be engaged with a sheave carried on a drive shaft or similar member.

Heretofore there have been various types of multiple sheaves provided wherein the constructions endeavor to provide a sheave structure that can readily be expanded or contracted to engage with more or less V-belts to transmit power to or from a desired shaft. Or, a sheave can be altered by the addition to it of standard parts to provide a sheave for engaging any number of V-belts, as desired. Some sheave elements have been provided heretofore in individual units that can be associated with each other in any desired numbers to provide the specific type of drive pulley desired. Insofar as I am aware, none of such units as proposed heretofore have been completely satisfactory commercially in that each separate unit provided has not been of identical shape with all other units and been adaptable to be used as any portion of a multiple sheave unit.

The general object of the present invention is to provide a new and improved multiple sheave unit wherein each element of the unit is characterized by being identical with all other members of the sheave unit.

A further object of the invention is to provide a multiple sheave unit wherein each individual unit is of disc shape and has a hub portion provided on only one lateral margin thereof, the sheave unit being rotatable in its own plane to different circumferential positions dependent upon its actual function in the multiple sheave unit.

A further object of the invention is to provide a sheave unit for a multiple sheave wherein each unit has two diametrically opposed key recesses therein with one of the recesses being similarly positioned circumferentially with relation to a series of circumferentially spaced tapped apertures through the unit as the other recess is with relation to a series of circumferentially spaced holes provided in the sheave unit.

A further object of the invention is to provide a multiple sheave unit which is of standard construction and can be inexpensively produced and provide sturdy operating life and with the sheave units being adapted to have spacer members provided therebetween if different width belts are to be engaged therewith.

The foregoing and other objects and advantages of the invention will be made more apparent as the specification proceeds.

In order to understand the present invention more completely, reference should be had to the accompanying drawings wherein one currently preferred embodiment of the principles of the invention is shown and wherein.

In the accompanying specification and the drawings, corresponding numerals are used to refer to corresponding parts so that comparison between parts shown in the drawing and referred to in the specification is facilitated.

Figure 1:
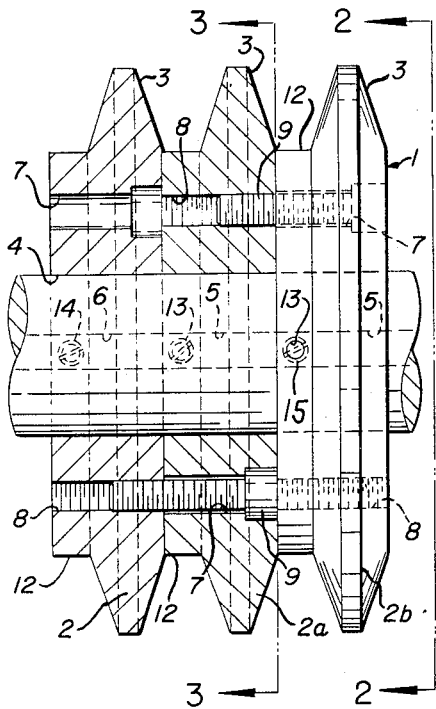
Fig. 1 is an elevation of a multiple sheave unit in operative position on a shaft.

The present invention relates to a multiple sheave unit that normally would be used in combination with a shaft and wherein a plurality of sheave sections are provided for positioning on a shaft with each of the sheave sections having alternate tapped and untapped holes at uniformly circumferentially spaced portions thereof to provide two sets of holes in each sheave section, which sheave sections each have a hub extending from only one side thereof and also have a pair of diametrically opposed keyways provided in the center bore thereof. One keyway is positioned circumferentially with relation to an adjacent untapped hole the same distance as the other keyway is to the adjacent tapped hole. The sheave sections are adapted to have socket head cap screw means extend through untapped holes in one of a plurality of assembled sheave sections and engage a tapped hole in the adjacent sheave section to secure such sections together as a unit, and to have other cap screw means for securing further sheave sections secured to such first unit and to have other sheave sections individually secured to the unit so that each sheave section is positioned 180° out of phase with relation to the section, or sections contacting it in the sheave unit.

Attention now is directed to the details of the structure shown in the accompanying drawings and the numeral 1 refers to an assembled sheave unit of the invention wherein a plurality of identically shaped sheave sections or members 2, 2a and 2b are abutted for engaging with a desired number of V-belts or other drive members. It will be seen that each of the sheave sections or members 2, 2a and 2b is of generally disc shape and that the peripheral portions 3 of the sheave sections are, in section, of generally frusto-triangular shape. Each sheave section has a center bore 4 extending therethrough and, as an important feature of the invention which will be explained hereafter in more detail, a pair of diametrically opposed keyways 5 and 6 are provided in the bore 4.

Figure 2:
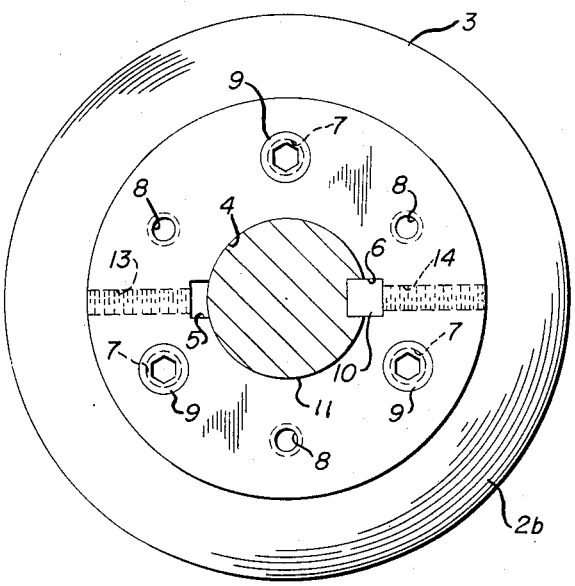
Fig. 2 is a side elevation taken on line 2—2 of the sheave member of the invention; and, Fig. 3 is a vertical section taken on line 3—3 of Fig. 1 to illustrate the different position of one multiple sheave unit circumferentially in the assembly with relation to the other sheave units of the assembly.
Figure 3:
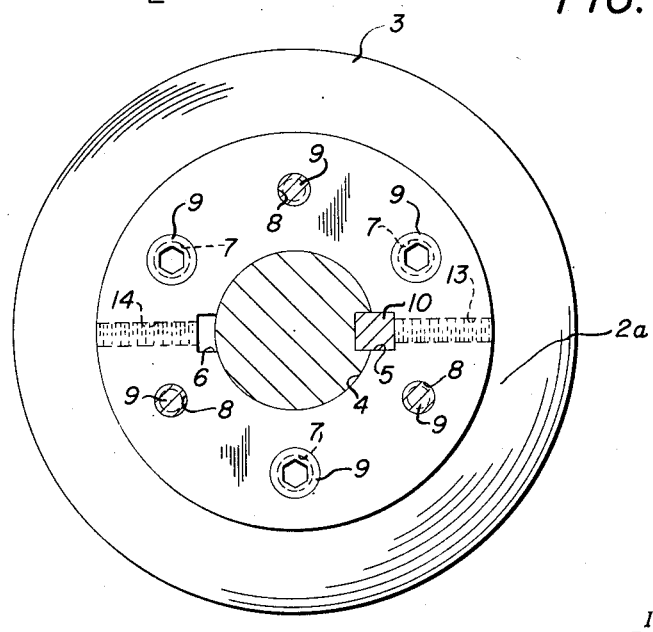

Figs. 2 and 3 of the drawings both show that there are two sets of bores or holes provided in each of the sheave sections 2, 2a and 2b to aid in securing such sheave sections together as an operative unit. Thus a plurality of untapped holes or bores 7, in this instance three in number, are provided at 120° circumferentially spaced relationship to each other in each sheave section. The second set of holes or bores 8 in each sheave section are tapped and likewise are positioned in 120° circumferentially spaced relation to each other; the holes of such second group of holes 8 being equally spaced intermediate the untapped holes 7. These holes 7 and 8 may be of the same effective diameter but in all events, the untapped holes 7 are of at least of the same diameter but may be larger than the tapped holes 8 so that a bolt or cap screw 9 can extend through a hole 7 in the sheave sections 2 and engage with a tapped hole 8 in the sheave section 2a, for example, and other cap screw means can extend through a hole 7 of the sheave section 2a to engage a tapped hole 8 in the sheave section 2b to secure the sections together as a unit.

It also should be especially noted that the keyway 5 is positioned in the same circumferential relationship to one of the holes of the set of holes 7 as the keyway 6 is positioned with relation to the closest hole of the group of tapped holes 8. Normally the keyways 5 and 6 will be positioned equidistant from the adjacent holes of each of the sets of holes 7 and 8, as indicated in the drawings. In all events, by providing the two sets of holes 7 and 8 and the two keyways 5 and 6 in the relationship as illustrated in the drawings, a person can assemble a plurality of the sheave sections with adjacent sheave sections rotated through 180° with relation to each other so that a tapped hole 8 on one section is aligned with an untapped hole 7 of the other sheave sections for engaging the bolts or cap screws 9 to secure the sheave sections together as an assembled unitary structure. A key 10 is used to secure the sheave sections to a shaft 11. The key 10 engages the keyway 5 in the sheave section 2a, and engages keyway 6 in the sheave sections 2 and 2b.

It will be noted that normally hubs 12 are provided on only one lateral margin of each of the sheave sections and that, if desired, spacer discs or other members, not shown, can be associated with and be positioned between each of the sheave sections to vary the width of the V-belt with which such sheave sections can be engaged.

Each of the sheave sections normally has set screw receiving holes 13 and 14, respectively, provided therein for receiving a set screw 15 to aid in holding the key 10 in position in either keyway 5 and 6 of the sheave sections, as required. In large size sheave, balanced holes can be provided to lighten the sheaves.

Of course, any desired number of the sheave sections can be secured together to provide a drive or driven unit the sections of which are identical and can easily be individually replaced, added to, or removed, as desired, without releasing the remainder of the assembled unit. The sheave sections are tightly secured together to provide a multiple belt unit with adjacent sections being secured to each other. The stocking of replacement parts for sheaves is simplified by the invention and the sheave is eassily assembled and used so that the objects of the invention are achieved.

While one complete embodiment of the invention has been disclosed herein, it will be appreciated that modification of this particular embodiment of the invention may be resorted to without departing from the scope of the invention as defined in the appended claims.

I claim:

1. A multiple sheave for V-belts and the like, which sheave includes a plurality of members each comprising a disc shaped body portion having a center bore and having a peripheral section of frusto-triangular shape in cross-section, a hub portion being provided on one lateral face of said body portion, said body portion having a set of bores therein parallel to said center bore at equally spaced circumferential portions thereof and having a set of tapped holes therein at equally spaced circumferential portions thereof intermediate and of the same size as said set of bores, said set of tapped holes being equal in number to said set of bores, and a pair of diametrically opposed keyways provided in said center bore with one keyway being spaced circumferentially from an adjacent one of said set of bores the same distance as the other keyway is spaced from the adjacent one of said set of tapped holes.

2. A multiple sheave for V-belts and the like, which sheave includes a plurality of members each comprising a disc shaped body portion having a center bore, said body portion having a set of bores therein parallel to said center bore at equally circumferentially spaced portions thereof and having a set of tapped holes therein at equally circumferentially spaced portions thereof intermediate the bores of said set of bores, said set of tapped holes being equal in number to said set of bores and being no larger than said bores, and a pair of diametrically opposed keyways provided in said center bore with one keyway being spaced circumferentially from an adjacent one of said set of bores the same distance as the other keyway is spaced from the adjacent one of said set of tapped holes.

3. A multiple sheave for V-belts and the like, which sheave includes a plurality of members each comprising a disc shaped body portion having a center bore, said body portion having a set of bores therein parallel to said center bore at equally spaced circumferential portions thereof and having a set of tapped holes therein at equally spaced distances circumferentially of the body portion intermediate the bores of said set of bores, said set of tapped holes being equal in number to said set of bores and being equally spaced therebetween, and a pair of diametrically opposed keyways provided in said center bore equally spaced circumferentially from the adjacent one of said set of bores and from the adjacent one of said set of tapped holes.

4. In combination, a shaft, at least a pair of sheave sections on said shaft, each of said sheave sections having two sets of alternate equal diameter tapped and untapped holes at uniformly circumferentially spaced portions thereof, said sheave sections each having a hub extending from only one side thereof, each of said sheave sections also having a pair of diametrically opposed keyways therein, and means extending through untapped holes in a sheave section and engaging a tapped hole in an adjacent sheave section to secure them together as a unit, said adjacent sheave section being positioned 180° out of phase with relation to the first named sheave section.

5. In combination, a shaft, a plurality of sheave sections on said shaft, each of said sheave sections having alternate tapped and untapped holes at uniformly circumferentially spaced portions thereof, said sheave sections each having a hub extending therefrom, each of said sheave sections also having a pair of diametrically opposed keyways therein, each of said sheave sections being positioned 180° out of phase with relation to any adjacent sheave sections, screw means extending through untapped holes in one end sheave section and engaging a tapped hole in an adjacent sheave section to secure them together as a unit, and key means engaging keyways in all of said sheave sections, and a set screw received in the hub of each of said sheave sections and engaging said key means to hold said key means and sheave sections in position.

6. In combination, a shaft, a plurality of sheave sections on said shaft, each of said sheave sections having two sets of alternate tapped and untapped holes at uniformly circumferentially spaced portions thereof, said sheave sections each having a hub extending from only one side thereof, each of said sheave sections also having a pair of diametrically opposed keyways therein with set screw receiving holes connecting thereto, each of said sheave sections being 180° out of phase with relation to an adjacent sheave section, means extending through untapped holes in one sheave section and engaging a tapped hole in an adjacent sheave section to secure them together as a unit, and means for securing said sheave sections to said shaft.

7. A multiple sheave for V-belts and the like, which sheave includes a plurality of members each comprising a disc shaped body portion having a center bore, said body portion having holes therein parallel to said center bore at equally spaced circumferential portions thereof and having alternate holes tapped and untapped, an equal number of tapped and untapped holes being provided, said tapped holes being so larger than said untapped holes, and a pair of diametrically opposed keyways in said center bore with one keyway being spaced circumferentially from the adjacent one of said untapped holes the same distance as the other keyway is spaced from the adjacent one of said set of tapped holes.

References Cited in the file of this patent

UNITED STATES PATENTS

| | | |
|---|---|---|
| 2,269,821 | Kemphert et al. | Jan. 13, 1942 |
| 2,510,644 | McCormick | June 6, 1950 |
| 2,548,387 | May | Apr. 10, 1951 |
| 2,632,333 | Eller | Mar. 24, 1953 |
| 2,633,751 | Browning | Apr. 7, 1953 |